(12) United States Patent
Zhang

(10) Patent No.: US 8,049,160 B2
(45) Date of Patent: Nov. 1, 2011

(54) LENS MODULE

(75) Inventor: Guoji Zhang, Shenzhen (CN)

(73) Assignee: Johnson Electric, SA, La Chaux-de-Fonds (CH)

( * ) Notice: Subject to any disclaimer, the term of this patent is extended or adjusted under 35 U.S.C. 154(b) by 318 days.

(21) Appl. No.: 12/481,019

(22) Filed: Jun. 9, 2009

(65) Prior Publication Data
US 2009/0303591 A1   Dec. 10, 2009

(30) Foreign Application Priority Data
Jun. 10, 2008   (CN) .......................... 2008 1 0067691

(51) Int. Cl.
*H01J 40/14* (2006.01)
*H04N 5/225* (2006.01)
(52) U.S. Cl. ......... 250/239; 250/216; 359/819; 348/374
(58) Field of Classification Search ................ 250/239, 250/216, 208.1; 257/432, 433; 359/507, 359/819, 829; 348/340, 373, 374, 375
See application file for complete search history.

(56) References Cited

U.S. PATENT DOCUMENTS
2005/0248684 A1 * 11/2005 Machida ....................... 348/373
* cited by examiner

*Primary Examiner* — Kevin Pyo
(74) *Attorney, Agent, or Firm* — Muncy, Geissler, Olds & Lowe, PLLC

(57) ABSTRACT

A lens module comprises an optical lens component having an optical axis, an image sensing component located adjacent the optical lens component, and a dust trap located between the optical lens component and the image sensing component. The optical lens component has with a lens mount and a lens barrel mounted in the lens mount by way of a threaded connection. The dust trap comprises body having a groove which locates behind the connection between the lens mount and the lens barrel, for receiving dust dropping from the connection, and an inner extension arm separating the groove from the image sensing component for preventing the dust in the groove from moving onto the image sensing component which could reduce the quality of the image.

9 Claims, 1 Drawing Sheet

LENS MODULE

CROSS REFERENCE TO RELATED APPLICATIONS

This non-provisional patent application claims priority under 35 U.S.C. §119(a) from Patent Application No. 200810067691.1, filed in The People's Republic of China on Jun. 10, 2008.

FIELD OF THE INVENTION

This invention relates to a lens module and in particular, to a lens module having a dust trap.

BACKGROUND OF THE INVENTION

A digital imaging product such as a digital camera, a digital video camera, a cell phone with imaging function, a notebook computer with a camera, is generally provided with a lens module. Usually, the lens module comprises an optical lens component and an image sensing component located behind the optical lens component in the optical axis direction with the image being recorded being located in front of the optical lens component. The optical lens component comprises a lens mount, a lens barrel threaded to the lens mount, and a lens fixed in the lens barrel. Light rays travel to the image sensing component through the lens. The image sensing component transforms optical signals into electrical signals, then the electrical signals are transformed into digital signals by an A/D converter, the digital signals are processed into digital images via a DSP, and then the digital images are stored in a storage medium.

However, in existing lens modules, it is easy for dust to hide at the location where the lens barrel and the lens mount are connected. After finishing assembling the lens module, whether in the transferring process, at the time of being fixed to electronic products, or when users are using the electronic products, dust located at the connection between the lens barrel and the lens mount is very easy to be dislodged and fall onto the image sensing component because of being vibrated or shaken, so stains or irregularities may occur in the image shot, which will reduce the quality of the image.

SUMMARY OF THE INVENTION

Hence there is a desire for a lens module in which dust from the connection between the lens holder and the lens mount will not contaminate the image or at least be greatly reduced.

This is achieved in the present invention by using a groove to trap the dust falling from the lens mount/lens barrel interface.

Accordingly, in one aspect thereof, the present invention provides a lens module comprising: an optical lens component having an optical axis; an image sensing component located adjacent the optical lens component; and a dust trap located between the optical lens component and the image sensing component, the optical lens component comprising a lens mount, a lens barrel mounted in the lens mount by a connection and a lens fixed to the lens barrel, wherein the dust trap comprises a groove axially spaced from the connection between the lens barrel and the lens mount for containing dust displaced from the connection between the lens barrel and the lens mount, and an inner extension arm separating the groove from the image sensing component for preventing dust received in the groove from migrating to the image sensing component.

Preferably, the dust trap comprises a body lying in a plane perpendicular to the optical axis, the body having a through hole aligned with the optical axis for the passage of light rays from the lens to the image sensing component.

Preferably, the outer extension arm of the dust trap is fixed to the lens mount by bonding.

Alternatively, the dust trap and the lens mount are formed as a single monolithic body.

Preferably, the inner extension arm extends towards the lens barrel from an edge of the through hole in the optical axis direction, and approaches or contacts an axially end face of the lens barrel.

Preferably, the dust trap further comprises an outer extension arm extending axially towards the lens mount from an outer edge of the body, and the groove is formed between the inner extension arm and the outer extension arm.

Preferably, wherein the image sensing component comprises an image sensor for receiving optical signals from the optical lens component, and the connection between the lens barrel and the lens mount is in front of a part of the image sensor.

Preferably, the lens barrel and the lens mount are connected by a threaded connection.

Preferably, the groove is axially aligned with the connection between the lens barrel and the lens mount and spaced there from towards the image sensing component.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
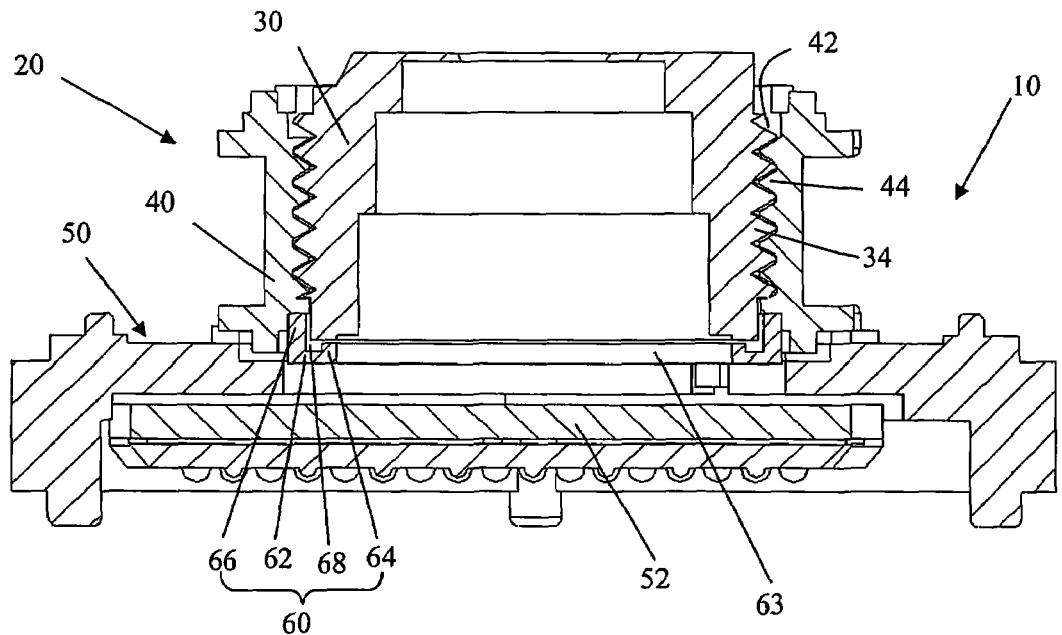
FIG. 1 is a sectional schematic diagram of a lens module according to a first embodiment of the present invention.

Referring to FIG. 1, the lens module 10 of the first embodiment comprises an optical lens component 20 having an optical axis, an image sensing component 50 located adjacent to or behind the optical lens component 20, and a dust trap 60 located between the optical lens component 20 and the image sensing component 50. The location behind and in front is viewed in the direction light travels along the optical axis through the lens component, which is vertically down in the orientation of the lens module shown in the drawings. The optical lens component 20 comprises a lens barrel 30 for fixing a lens (not shown) within it, and a lens mount 40 for mounting the lens barrel 30. The lens barrel is mounted in the lens mount by a connection, preferably a threaded connection. The radially outer side of the lens barrel 30 is provided with an external thread 34. The inner side of the lens mount 40 is provided with a hole 42 for mounting of the lens barrel 30. The radially inner wall of the lens mount 40 is provided with an internal thread 44 around the hole 42, such that the external thread 34 of the lens barrel 30 can be screwed to the internal thread 44 forming a threaded connection so as to fix or mount the lens barrel 30 in the lens mount 40.

The image sensing component 50 comprises an image sensor 52, which lies in a plane perpendicular to the optical axis and behind the lens barrel 30, for receiving optical signals from the lens. The location of the threaded connection between the lens barrel 30 and the lens mount 40 is directly adjacent to or in front of a part of the image sensor 52.

The dust trap 60 comprises a body 62, an inner extension arm 64, an outer extension arm 66, and a groove 68 formed between the inner extension arm 64 and the outer extension arm 66. The body 62 lies in a plane which is perpendicular to the optical axis, and is has a through hole 63 aligned with the optical axis for the passage of light rays from the lens to the image sensor 52. The groove 68 is axially spaced from or behind the connection between the lens barrel 30 and the lens mount 40, and arranged to receive or trap the dust falling from the connection between the lens barrel 30 and the lens mount 40. The inner extension arm 64 extends towards the lens barrel from an edge of the through hole 63 in the optical axis direction, and approaches or contacts the back end face of the lens barrel 30, so as to isolate or separate the groove 68 from the image sensing component 50, to prevent dust received in the groove 68 from further moving or migrating onto the image sensor 52. The outer extension arm 66 extends towards the lens mount from an outer edge of the body 62 and is fixed to the lens mount 40 by any suitable method such as bonding.

Figure 2:
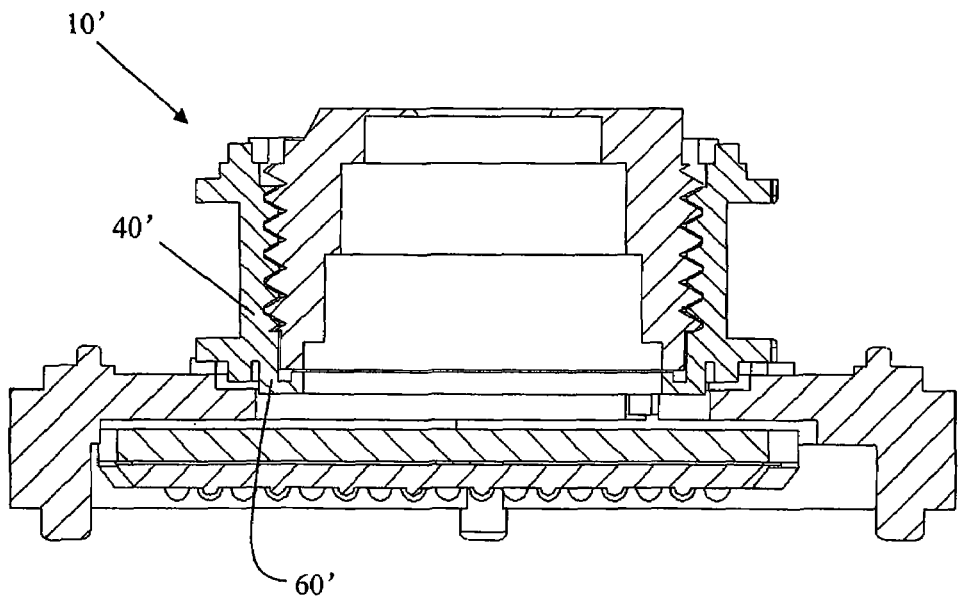
FIG. 2 is a sectional schematic diagram of a lens module according to a second embodiment of the present invention.

FIG. 2 is a schematic diagram of the lens module 10' of the second embodiment. The difference from the lens module 10 of the first embodiment is that: the dust trap 60' and the lens mount 40' are combined or integrated as a single unit, that is, the outer extension arm of the dust trap 60' extends from or is incorporated into the lens mount 40' as single monolithic body.

It is to be understood that although, in the above mentioned embodiments, the lens barrel 30 is implied to be round and is screwed into the lens mount, the lens barrel may be otherwise shaped and the threads may be engaged by means other than by being screwed together, e.g., by being pressed together. As such the cross sectional shape of the lens barrel may be square, rectangular, elliptical, etc. Indeed, the connection between the lens barrel and the lens mount may not be a threaded connection.

In the embodiments described above, dust at the connection between the lens barrel and the lens mount will drop into the groove of the dust trap when vibrated, rocked or shaken, and the inner extension arm of the dust trap can prevent the dust in the groove from further migrating onto the image sensor, so as to avoid or reduce dust from the connection falling onto the image sensor, which would cause a reduction in the quality of the image.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A lens module comprising: an optical lens component having an optical axis; an image sensing component located adjacent the optical lens component; and a dust trap located between the optical lens component and the image sensing component, the optical lens component comprising a lens mount, a lens barrel mounted in the lens mount by a connection and a lens fixed to the lens barrel, wherein the dust trap comprises a groove axially spaced from the connection between the lens barrel and the lens mount for containing dust displaced from the connection between the lens barrel and the lens mount, and an inner extension arm separating the groove from the image sensing component for preventing dust received in the groove from migrating to the image sensing component.

2. The lens module of claim 1, wherein the dust trap comprises a body lying in a plane perpendicular to the optical axis, the body having a through hole aligned with the optical axis for the passage of light rays from the lens to the image sensing component.

3. The lens module of claim 2, wherein the inner extension arm extends towards the lens barrel from an edge of the through hole in the optical axis direction, and approaches or contacts an axially end face of the lens barrel.

4. The lens module of claim 1, wherein the dust trap and the lens mount are formed as a single monolithic body.

5. The lens module of claim 3, wherein the dust trap further comprises an outer extension arm extending axially towards the lens mount from an outer edge of the body, and the groove is formed between the inner extension arm and the outer extension arm.

6. The lens module of claim 5, wherein the outer extension arm of the dust trap is fixed to the lens mount by bonding.

7. The lens module of claim 1, wherein the image sensing component comprises an image sensor for receiving optical signals from the optical lens component, and the connection between the lens barrel and the lens mount is in front of a part of the image sensor.

8. The lens module of claim 1, wherein the lens barrel and the lens mount are connected by a threaded connection.

9. The lens module of claim 1, wherein the groove is axially aligned with the connection between the lens barrel and the lens mount and spaced there from towards the image sensing component.

* * * * *